United States Patent

Folker

[11] 4,041,636
[45] Aug. 16, 1977

[54] TROLLING ACCESSORY FOR FISHING

[76] Inventor: John F. Folker, 2615-17 N. Lakewood, Chicago, Ill. 60614

[21] Appl. No.: 638,645

[22] Filed: Dec. 8, 1975

[51] Int. Cl.² ............................................. A01K 85/00
[52] U.S. Cl. .................................. 43/42.31; 43/42.06; 43/42.34; 43/42.51
[58] Field of Search ................. 43/42.31, 42.32, 42.29, 43/42.5, 42.51, 42.17, 42.18, 42.19, 42.06, 42.16, 42.2, 42.14, 43.13, 42.34

[56] References Cited

U.S. PATENT DOCUMENTS

| | | | |
|---|---|---|---|
| 1,837,656 | 12/1931 | Crosby | 43/42.32 |
| 2,235,905 | 3/1941 | Sherwood | 43/42.29 |
| 2,637,134 | 5/1953 | Davidson | 43/42.32 |
| 3,673,727 | 7/1972 | Bauer | 43/42.5 |
| 3,855,721 | 12/1974 | Strader | 43/42.32 |

Primary Examiner—John F. Pitrelli
Assistant Examiner—Peter K. Skiff
Attorney, Agent, or Firm—Hill, Gross, Simpson, Van Santen, Steadman, Chiara & Simpson

[57] ABSTRACT

A fish attracting device having a flat elongated body is attached to a fishing line several feet in front of a fish capturing means such as a lure. As the device is drawn through a body of water, the device rotates as passing water contacts eight deflecting surfaces. Rotation is further enhanced by a center opening reducing drag and providing a streamlined path for water flow. Rotation causes turbulence and noise as well as visible flashes of reflected light from a mirror-like or a brightly contrastedly painted body to attract surrounding fish.

8 Claims, 7 Drawing Figures

U.S. Patent  Aug. 16, 1977  4,041,636
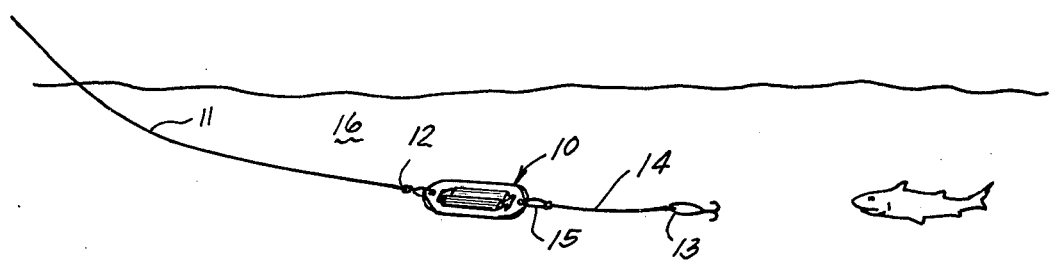
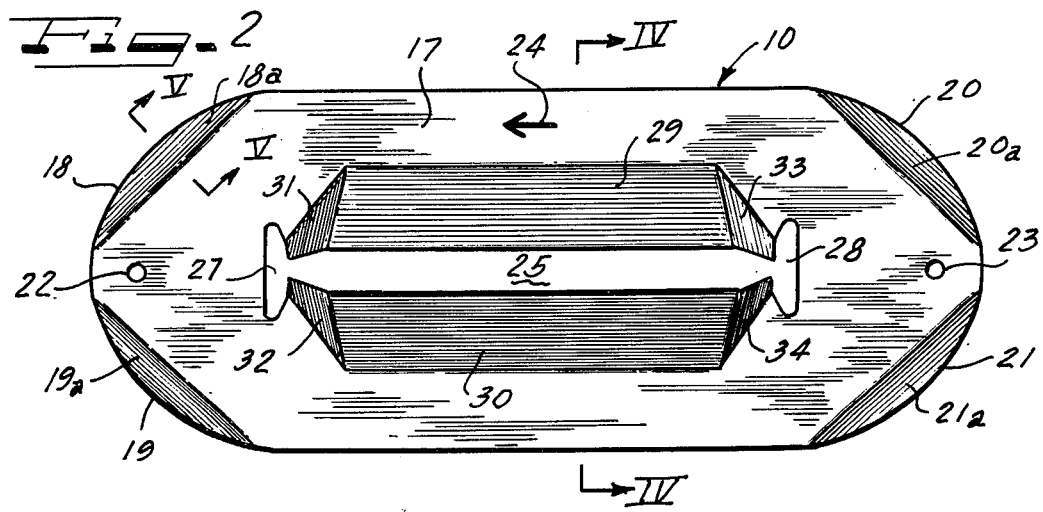
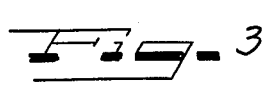
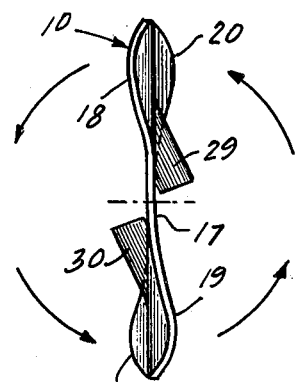
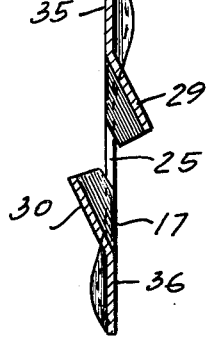
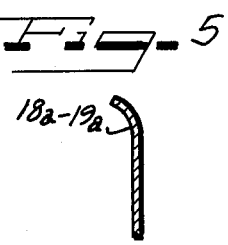
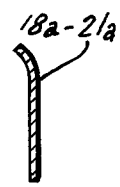
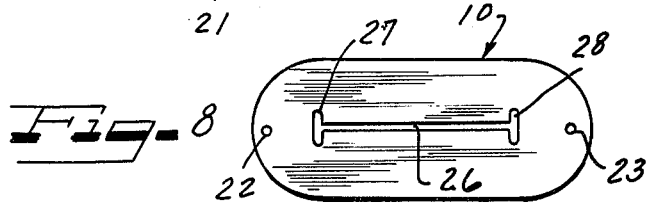
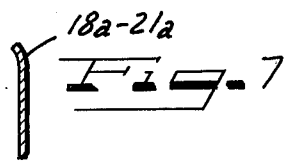

TROLLING ACCESSORY FOR FISHING

BACKGROUND OF THE INVENTION

1. Field of Invention

This invention relates generally to fish attracting devices used with a fish capturing means such as a lure. To increase the productivity of sports fishing, means are provided to attract the attention of fish to the fish capturing means.

2. Description of Prior Art

Heretofore, sports fishermen have had available numerous fish capturing means, such as the fishing lure. Lures are available in unlimited colors, shapes and with various movements and combinations thereof. If a particular lure is not producing satisfactory results, the user changes his lure in hope of increased success. The ability of the fisherman to gain an interest of a fish has been limited to the attracting features of the lure.

SUMMARY OF THE INVENTION

In accordance with this invention, an attracting device is placed several feet in front of a fishing lure of other fish capturing means. Swivel joints are positioned between a fishing line connecting to the front of the device and the lure trailing to the rear. The device is best suited for use when fishing by trolling but may also be used when bait casting. When bait casting, the size of the device must remain relatively small to allow the fisherman to properly cast the device and lure. The size of the device used when fishing by trolling can be somewhat larger since trolling is used extensively for lake fishing for such larger fish as the Coho salmon or deep-sea fishing for even larger game fish.

The device has a flat elongated plate-like body with attaching holes front and rear for connection to the front and rear swivel joints. The body has four rounded corners which have been alternately bent inward and outward to form rotational flanges or propeller or impeller surfaces which develop reaction forces suitable to produce a torque and hence a rotational moment as the device is drawn through a body of water. The amount of bend in these outer rotational flanges can be varied to increase the amount of rotational moment produced and thereby increase the number of rotations per foot of travel.

A middle portion of the device is formed to provide an opening to reduce water resistance to rotation. This inner formed area also provides deflecting surfaces producing a rotational moment. The exterior surface of the device can be either a bright plated nickel-chrome or painted in contrasting colors, or in a selected mix of patterns including any selected geometric design.

Attention of a fish is obtained first by the rotation which creates a certain amount of turbulence and noise within the water. Secondly as the device rotates, it produces a flashing effect as light from above is reflected from the rotating surfaces. A combination of turbulence and flashing of the reflector light creates the type of attention getting activity necessary to arouse interest in nearby fish.

BRIEF DESCRIPTION OF THE DRAWINGS

FIG. 1 is a view of the device in use within a body of water.

FIG. 2 is a detailed view of the flat elongated side of the device.

FIG. 3 is a front view of the device depicting rotation as it is drawn through a body of water.

FIG. 4 is a cross-sectional view through the device shown in FIG. 2 to the rear.

FIG. 5 is a cross-sectional view through a flanged corner portion of the device having a maximum spin characteristic.

FIG. 6 is a cross-sectional view through a flanged corner portion of a device having an intermediate spin characteristic.

FIG. 7 is a cross-sectional view through a flanged corner of a device having a minimum spin characteristic.

FIG. 8 is a view of a blank from which the device is formed.

DETAILED DESCRIPTION OF THE INVENTION

Referring to the drawings, a fish attracting device is shown generally at 10. As shown in FIG. 1, the device 10 is attached to a fishing line 11 through a front swivel joint 12. A lure or other capturing means is shown at 13 and is attached to a leader 14 which connects to the device 10 through a rear swivel 15. By providing the swivels 12 and 15 at the front and rear respectively, the attaching device 10 is free to rotate without interferring with any motion predesigned into the lure 13 as the device 10 and the lure 13 are drawn through a body of water 16.

As shown in FIG. 2, the device 10 has a flat elongated rectangular body 17 with four radius corners 18, 19, 20 and 21. The rounding of the corners has several beneficial effects. First, it allows safer handling of the device by the user. Secondly, the radiusing has the effect of streamlining the front of the device 10 reducing water resistance. Thirdly, the radiusing allows for a simplified control of the degree of rotation which the device 10 is to have. In this regard the rounded corners form impeller surfaces 18a, 19a, 20a and 21a which are acted upon by the water. In other words, the elongated device has a longitudinal axis and the surfaces or blades are disposed at a radius relative to the axis or hub of the device thereby to develop a driving force which is like a torque or a rotational moment. The device 10 has a front and rear attaching hole 22 and 23 which align with the longitudinal axis of the device 10.

To appreciate the uniqueness of the rotational means provided by the various deflecting surfaces of the device 10, it must first be pointed out that the device 10 is directional in that it has a front and rear. An arrow 24 is stamped into body 17 so that the user will properly connect the device 10 to the fishing line 11. With the device 10 so attached, the rotation of the device is clockwise in that the four radius corners 18, 19, 20 and 21 have been so flanged that a clockwise rotational moment is created when the device 10 is drawn through the body of water 16.

As shown in FIGS. 5, 6 and 7, the amount of deflection formed in the radius corners 18, 19, 20 and 21 vary. The deflection surfaces 18a–21a, as shown in FIG. 5, are pitched in such a construction arrangement as to provide approximately three revolutions per yard of travel while the amount of deflection in the surfaces 18a–21a shown in FIG. 6 and FIG. 7 produce approximately two and one revolutions per yard of travel respectively. It is desirable to cause more attention getting activity in water having poorer visibility and in water having a temperature which is adverse to fish activity.

In order to enhance proper rotation, water resistance to rotation is reduced by providing an opening 25 in a center portion of the body 17. This opening 25 is formed in a two step procedure. As shown in FIG. 8, an approximate ⅛ inch wide elongated slot 26 first is formed along the longitudinal axis of the body 17. At each end of this slot 26 is a vertical oblong opening 27 and 28. With this material so removed, an upper flange 29 and a lower flange 30 is formed along a line parallel to and above and below the longitudinal axis respectively. At each end of the flanges 29 and 30, and angled deflection segment 31, 32, 33 and 34 is formed which connect the respective ends of the flanges 29 and 30 with the body 17.

This simple procedure creates a unique inner structure. First, deflecting segments 31, 32, 33 and 34 also form impeller or propeller surfaces which produce clockwise rotation moments when the device 10 is drawn through the body of water 16. Secondly, the flanging increases the size of the opening 25 to decrease water resistance. Thirdly, the flanges 29 and 30 provide a streamlined path for a flow of water through opening 25.

As the device 10 rotates clockwise, water adjacent to an upper counterclockwise surface 35 and a lower clockwise surface 36 resist clockwise rotation of the device 10. In overcoming this resistance, the water adjacent to the upper counterclockwise surface 35 is forced to pass under the bottom surface of upper flange 29, while the water on the lower clockwise surface 36 is forced to pass over the top of lower flange 30. If the device 10 is improperly attached, i.e. the rear were made the front, the water resisting rotation of the upper and lower surfaces 35 and 36 would not flow through opening 25 in a streamlined path in that the water would be forced to flow over and around the top surface of upper flange 29 and over and around the bottom surface of the lower flange 30. Such a path of water flow would increase rotational drag significantly. In one forming operation, a rotational drag reducing opening and four rotational moment producing surfaces are created.

It should be understood that if desired, hooks may be connected directly to the front and rear attaching holes 22 and 23. For example, a large single hook could be connected to the lead opening and a large triple hook could be attached to the trailing opening, thereby providing an excellent lure for large game fish. Other permutations of single or multiple hooks could also be provided.

While various modifications may be suggested by those versed in the art, it should by appreciated that I wish to embody within the scope of the patent warranted herein, all such modifications as reasonably and properly come within the scope of my contribution to the art.

I claim as my invention:

1. A fish attracting means for use with a fish capturing means such as a lure when said lure is drawn through a body of water comprising:
   a flat rectangular body having attaching means at the front and rear portions thereof along the longitudinal axis of said body,
   a rotation means carried by said body comprising plural upper and lower deflection surfaces on said front and rear portions and on opposite sides of the longitudinal axis of said body, said surfaces disposed at acute angles to the plane of the lure body to produce counterclockwise rotational moment, and
   rotational drag reduction means to reduce a resistance to rotation comprising an elongated opening in a center portion of said body and along the longitudinal axis of said body having formed along one edge of said opening an upper flange and along the opposite edge a lower flange and each flange forming an acute angle to the plane of the lure body so that the water resisting rotation flows in a streamlined path through said opening.

2. A fish attracting means as defined by claim 1 and further characterized by,
   said attaching means defined by two circular holes located in a front and rear portion of said body on the longitudinal axis of said body and prepared for attachment to said swivel means.

3. A fish attracting means as described in claim 1 and further characterized by,
   said body having a highly reflected surface for reflecting a source of light,
   wherein said device rotates to cause turbulence and flashes reflected light to attract fish to said capturing means.

4. A fish attracting means as described in claim 1 and further characterized by,
   said body being painted with highly visible and contrasting colors,
   wherein said device rotates to cause turbulence and flashes or reflected colored light to attract fish to said capturing means.

5. A fish attracting means as defined in claim 1 and further characterized by said rotation drag reduction means including,
   means formed in said body and comprising angled deflection segments offset from the plane of said body and acted upon by the water to enhance the rotational movement of the body.

6. A fish attracting and capturing system for use in a body of water comprising,
   a. an attracting means comprising a flat elongated body having a front and rear attaching means defined by two circular holes located in a front and rear portion of said body on the longitudinal axis thereof, deflecting surfaces to cause rotation of said body including a top front, a bottom front, a top rear and a bottom rear radius corner of said elongated body flanged outwardly, said flanges formed along a first line positioned parallel to a second tangent line intersecting with said radius corner at a midpoint thereof, and said second tangent line forming a right angle with a third line intersecting said midpoint of said radius and a center point of said radius, said first line being a distance from said center point less than a distance from said first parallel line to said midpoint of said radius, said top front and bottom rear flanges projecting outwardly to a counterclockwise side of the vertical axis of said body and said bottom front and said top rear projecting outwardly to a clockwise side of said vertical axis of said body,
   b. a swivel means, said means attached one each to the front and rear attaching means of said body to allow free rotation of said body,
   c. a pulling means for drawing said attracting means along a path through the body of water, said means connected to said front swivel means, d. a connecting means having a front and rear portion, said front portion, said front portion connected to the rear swivel means, e. a fish capturing means comprising a lure, said lure connected to the rear portion of said connecting means, and f. a drag reduction means to reduce water resistance to rotation by providing a streamlined flow path comprising, an opening in a center portion of said body, and an upper and lower flange having a front and rear portion, said upper flange formed along a line parallel to and above the longitudinal axis of said body, said flange forming an acute angle with the vertical axis to the clockwise side of said body, and a lower flange formed along a line parallel to and below the longitudinal axis of said body, said flange forming an acute angle with the vertical axis to the counterclockwise side of said body, and two vertical elongated openings located adjacent to the front and rear portions of said flanges, wherein said attracting means freely rotates to cause turbulence and flashes of reflected light to gain attention of nearby fish.

7. A fish attracting and/or capturing device to be drawn through a body of water comprising, a. a flat elongated body having radius corners, a front attaching means adapted for attachment to a fishing line and a rear attaching means adapted for attachment to a fish capturing means, said attaching means positioned on the longitudinal axis of said body, b. first rotational producing surfaces to cause said body to rotate counterclockwise as said device is drawn through said body of water comprising said radius corners selectively formed outwardly on an angle from a plane intersecting a top and bottom elongated edge of said body, c. rotational resistance reduction means comprising, an elongated opening through a center of said body having a top edge including an upper flange formed on an acute angle with said plane to a counterclockwise side of said body, and having a bottom edge including a lower flange formed on an acute angle with said plane to a clockwise side of said body, and d. second rotational producing means to cause said body to rotate counterclockwise as said body is drawn through said body of water comprising segments joining a front and rear portion of said upper and lower flange and an adjacent body portion, wherein spin characteristics of said device are enhanced by said water passing through said center opening in a streamlined path.

8. A fish attracting device for use with a fish capturing means such as a lure when said lure is drawn through a body of water comprising, a. a flat rectangular body, b. an attaching means defined by two circular holes located in a front and rear portion of said body along the longitudinal axis of said body, c. a rotation means carried by said body to cause said body to rotate counterclockwise as said body is drawn through the body of water comprising eight deflection surfaces, said surfaces forming acute angles to a front and a rear with the longitudinal axis of said body, four of said surfaces located a distance above and four a distance below said axis, said distances being equal, said surface prepared to contact said water and produce a counterclockwise rotational moment from said contact, d. a rotational drag reduction means to reduce a resistance to rotation caused by said water comprising an opening in a center portion of said body, said opening in the center portion of said body formed by an upper and a lower flange having a front and rear portion thereof, said upper flange formed along a line parallel to and above the longitudinal axis of said body, said upper flange forming an acute angle with the vertical axis to the clockwise side of said body and said lower flange formed along a line parallel to and below the longitudinal axis of said body, said lower flange forming an acute angle with the vertical axis to the counterclockwise side of said body, and two vertical elongated openings joining and located adjacent to a front and rear of said opening, and said rotation means further comprising a top front, a bottom front, a top rear and a bottom rear radius corner of said body flanged outwardly, said flanges formed along a first line positioned parallel to a second tangent line intersecting with said radius corner at a midpoint thereof and said second tangent line forming a right angle with a third line intersecting the center point of said radius and the midpoint of said radius corner, said first parallel line being a distance from said center point less than a distance from said first parallel line to said midpoint of said radius corner, said top front and bottom rear flanges projecting outwardly to the counterclockwise side of said body and said bottom front and top rear flanges projecting outwardly to the clockwise side of said body, and four deflecting segments joining the front and rear portions of said upper and lower flanges and said body respectively, wherein said device rotates as said device is drawn through said water to attract fish to said capturing means.

* * * * *